(12) United States Patent
Kalbeck et al.

(10) Patent No.: US 9,709,044 B2
(45) Date of Patent: Jul. 18, 2017

(54) METHOD FOR THE VACUUM SUPPLY FOR A PNEUMATIC BRAKE BOOSTER OF A MOTOR VEHICLE BRAKING SYSTEM

(71) Applicant: Continental Teves AG & Co. oHG, Frankfurt (DE)

(72) Inventors: Alexander Kalbeck, Burglengenfeld (DE); Bernd Pfaffeneder, Regensburg (DE); Jürgen Stürzer, Aiterhofen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 238 days.

(21) Appl. No.: 14/649,622

(22) PCT Filed: Dec. 6, 2013

(86) PCT No.: PCT/EP2013/075849
§ 371 (c)(1),
(2) Date: Jun. 4, 2015

(87) PCT Pub. No.: WO2014/086995
PCT Pub. Date: Jun. 12, 2014

(65) Prior Publication Data
US 2015/0322930 A1   Nov. 12, 2015

(30) Foreign Application Priority Data

Dec. 7, 2012 (DE) .......................... 10 2012 222 545

(51) Int. Cl.
*F04B 17/02* (2006.01)
*F04B 17/03* (2006.01)
(Continued)

(52) U.S. Cl.
CPC .............. *F04B 17/03* (2013.01); *B60T 13/52* (2013.01); *B60T 17/02* (2013.01)

(58) Field of Classification Search
CPC ...... F04B 17/02; F04C 25/02; F04C 2220/10; B60T 13/52; B60T 17/02; B60T 17/22
See application file for complete search history.

(56) References Cited

U.S. PATENT DOCUMENTS 3,824,792 A * 7/1974 Grabb ................... B60T 13/52
                                                       417/395
5,918,462 A * 7/1999 Mitani ................... B60T 13/52
                                                       123/339.14
(Continued)

FOREIGN PATENT DOCUMENTS

DE         10016737        10/2001
DE         10052257        5/2002
(Continued)

OTHER PUBLICATIONS

German Search Report mailed Mar. 18, 2013 for German Application No. 10 2012 222 545.5, including partial translation.
(Continued)

*Primary Examiner* — Patrick Hamo
(74) *Attorney, Agent, or Firm* — RatnerPrestia

(57) ABSTRACT

A method for supplying vacuum for a pneumatic brake booster for a motor vehicle braking system, using an electromotively-driven displacement type pump assembly. At least one pressure sensor for monitoring a pneumatic pressure is associated with the pump assembly, and electric signals of the pressure sensor are fed to an electronic unit, analyzed, and processed in order to regulate the pressure. A plausibility check of the pressure sensor signal is carried out by a pressure value amplitude being determined, by signal analysis, in the form of a difference between a maximum pressure value and a minimum pressure value within a stroke of the displacement element, and this being compared to a stored comparison value wherein if the pressure value
(Continued)

amplitude deviates from the comparison value by a defined amount, the signal of the pressure sensor is then defined as implausible.

16 Claims, 3 Drawing Sheets

(51) Int. Cl.
  *B60T 13/52* (2006.01)
  *B60T 17/02* (2006.01)

(56) References Cited

U.S. PATENT DOCUMENTS

| | | | |
|---|---|---|---|
| 6,412,455 B1* | 7/2002 | Ogiso | B60T 13/52 |
| | | | 123/399 |
| 7,909,413 B2 | 3/2011 | Schonlau | |
| 8,731,756 B2 | 5/2014 | Krueger | |
| 9,593,680 B2* | 3/2017 | Liddington | F04B 49/02 |
| 2005/0110343 A1* | 5/2005 | Gronau | B60T 8/442 |
| | | | 303/116.2 |
| 2005/0165522 A1* | 7/2005 | Lehner | B60T 13/52 |
| | | | 701/31.1 |
| 2012/0141299 A1* | 6/2012 | Bang | B60T 13/52 |
| | | | 417/22 |
| 2013/0297179 A1 | 11/2013 | Gruber | |

FOREIGN PATENT DOCUMENTS

| | | |
|---|---|---|
| DE | 10224590 | 2/2003 |
| DE | 102004047291 | 3/2006 |
| DE | 102005027768 | 4/2006 |
| DE | 102011088938 | 7/2012 |
| DE | 102012207553 | 11/2012 |
| WO | 0234601 | 5/2002 |
| WO | 2005123476 | 12/2005 |
| WO | 2007082932 | 7/2007 |
| WO | 2011054623 | 5/2011 |

OTHER PUBLICATIONS

International Search Report for International Application No. PCT/EP2013/075849 mailed Mar. 11, 2014.

* cited by examiner

_US 9,709,044 B2_

METHOD FOR THE VACUUM SUPPLY FOR A PNEUMATIC BRAKE BOOSTER OF A MOTOR VEHICLE BRAKING SYSTEM

CROSS REFERENCE TO RELATED APPLICATIONS

This application is the U.S. National Phase Application of PCT International Application No. PCT/EP2013/075849, filed Dec. 6, 2013, which claims priority to German Patent Application No. 10 2012 222 545.5, filed Dec. 7, 2012, the contents of such applications being incorporated by reference herein.

FIELD OF THE INVENTION

The invention relates to a method for supplying a vacuum for a pneumatic brake booster of a motor vehicle brake system.

BACKGROUND OF THE INVENTION

Brake systems of modern motor vehicles are often equipped with pneumatic brake boosters. Such brake systems require, for the satisfactory generation of braking force, a vacuum which in many cases has to be made available by means of dedicated pump assemblies. Because continuous availability of a braking force which is sufficient at any time is safety-relevant to a high degree, particularly stringent requirements are made of the vacuum supply in terms of its reliability, which requires continuous monitoring of the vacuum level which is available for the brake booster.

Brake systems with pneumatic differential-pressure-controlled brake boosters are known from motor vehicles, which brake systems have electromotively-driven pump assemblies with expeller elements which can be moved in a stroke-like fashion in order to supply vacuum to the brake booster at least in a supportive fashion, and in which brake systems the vacuum level is measured by means of pressure sensors which are embodied in a redundant fashion. The function monitoring of the brake system and control of the pump assembly therefore depend on the signals of the pressure sensors. In order to increase the reliability of the measurement and to diagnose pressure sensor errors in good time, the values which are recorded simultaneously by means of two pressure sensors are compared with one another and in this way noticeable implausible signals of one of the sensors are detected.

An intensive outlay in terms of costs and installation space owing to the use of two pressure sensors with associated connections and lines as well as necessary evaluation hardware and control hardware is considered to be in need of overall improvement.

SUMMARY OF THE INVENTION

An aspect of the invention provides a method for supplying a vacuum, which method ensures the necessary high reliability value of the function monitoring and at the same time provides a cost advantage over the prior art and makes possible devices with relatively small installation space requirements.

Solution and Advantages

According to an aspect of the invention the signal of the signal-emitting pressure sensor is used itself as a source for its plausibility checking in that a pressure value amplitude dU which is assigned to the averaged pressure value is determined from the signal, wherein the pressure value amplitude constitutes a difference between a pressure value maximum and a pressure value minimum within a stroke of the expeller element, and is subsequently compared with a reliable comparison value, known a priori, for the pressure value amplitude. If a deviation of the pressure value amplitude from the comparison value exceeds a defined absolute value, the signal can be classified as not being plausible or as being implausible.

As a result, it is advantageously possible to dispense with a further pressure sensor together with the associated plug and line, and the electronic control unit can be configured in a more space-saving, simple and cost-effective way. At the same time, simple and reliable error-monitoring and diagnosis are made possible and the functional readiness of the pump device is increased. At the same time, the EMC stability of the overall system can be improved by making savings in terms of electronic components and current-conducting electrical lines.

In one advantageous development of the invention, a plurality of comparison values can be stored in a characteristic diagram in the electronic control unit, wherein the characteristic diagram is assigned to a value range of the pressure value p which can be generated in the brake booster. This permits continuous plausibility checking of the pressure sensor signal, which is particularly advantageous because it is possible at any time and at virtually all operating points.

Particularly reliable evaluation of the sensor signal can be achieved according to the invention in that the signal of the pressure sensor is not defined as implausible until the deviation of the pressure value amplitude from the comparison value exceeds a defined absolute value in a configurable number of cases.

Prompt detection of implausibility of the signal can advantageously permit the electronic control unit to initiate a reaction activity to warn the driver or to influence an engine controller or a brake controller or to set an error code, for example issuing of a warning message to the driver or the activation of a separate engine control program or brake system control program. As a result, traffic safety can be improved and the driver can be alerted to a possible problem, and the risk of damage to the vehicle or even accidents can be significantly reduced.

In the advantageous developments of the invention, the comparison values or characteristic diagrams which are necessary to check the plausibility of the signal can be calculated or recorded before the pump assembly is first activated, and can be subsequently stored in the electronic control unit, with the result that they are already available at the first activation. However, it is also possible to record the comparison values or characteristic diagrams during a first activation, for example a test run of the pump assembly in a suitable device or else also during a first activation of a brake system which has been proven to be without faults, and to store said comparison values or characteristic diagrams in the electronic control unit. It can therefore be reliability ensured that the comparison values or the characteristic diagrams correspond as precisely as possible to the respective brake system, and particularly reliable plausibility checking is therefore possible.

In further advantageous developments of the method according to the invention, the plausibility checking can be deactivated briefly for a configurable period. This is particularly important in the case of specific highly dynamic events such as, for example, activation of the brake booster by activation elements or assemblies, starting up of the pump assembly, a cold start of the engine of the motor vehicle, activation of a handbrake, an overvoltage or undervoltage or voltage pulses in an electrical on-board power system of the motor vehicle, or further events which can influence a signal of the pressure sensor briefly but significantly.

Therefore, incorrect estimations owing to non-predefined behavior of the signal can be ruled out, which ultimately gives rise to a high level of system robustness and reliability.

A particularly advantageous device for carrying out the method according to the invention can have a pump assembly with two expeller elements which can move synchronously in opposite directions in a boxer arrangement, wherein the expeller elements have elastic diaphragm elements at their ends, and wherein a single pressure sensor can be provided for monitoring a pressure difference between at least one working chamber and at least one vacuum chamber of the brake booster or a pressure prevailing in at least one vacuum chamber of the brake booster, and for checking the plausibility of the signal of the pressure sensor.

In this way, a reliable, low-vibration, quiet and at the same time maintenance-free and low-wear vacuum supply can be ensured.

BRIEF DESCRIPTION OF THE DRAWINGS

Further details, features, advantages and application possibilities of the invention can be found in the dependent claims together with the description on the basis of the drawings. Corresponding components and structural elements are provided with the same reference symbols where possible. In the drawings below:

DETAILED DESCRIPTION OF THE PREFERRED EMBODIMENTS

FIG. 1

Because the design and method of functioning of essential components of a hydraulic brake system with a pneumatic brake booster, such as, for example, a master brake cylinder or the brake booster itself, are sufficiently known, a precise explanation thereof will not be given below in so far as this does not appear essential for the description of the invention.

Figure 1:
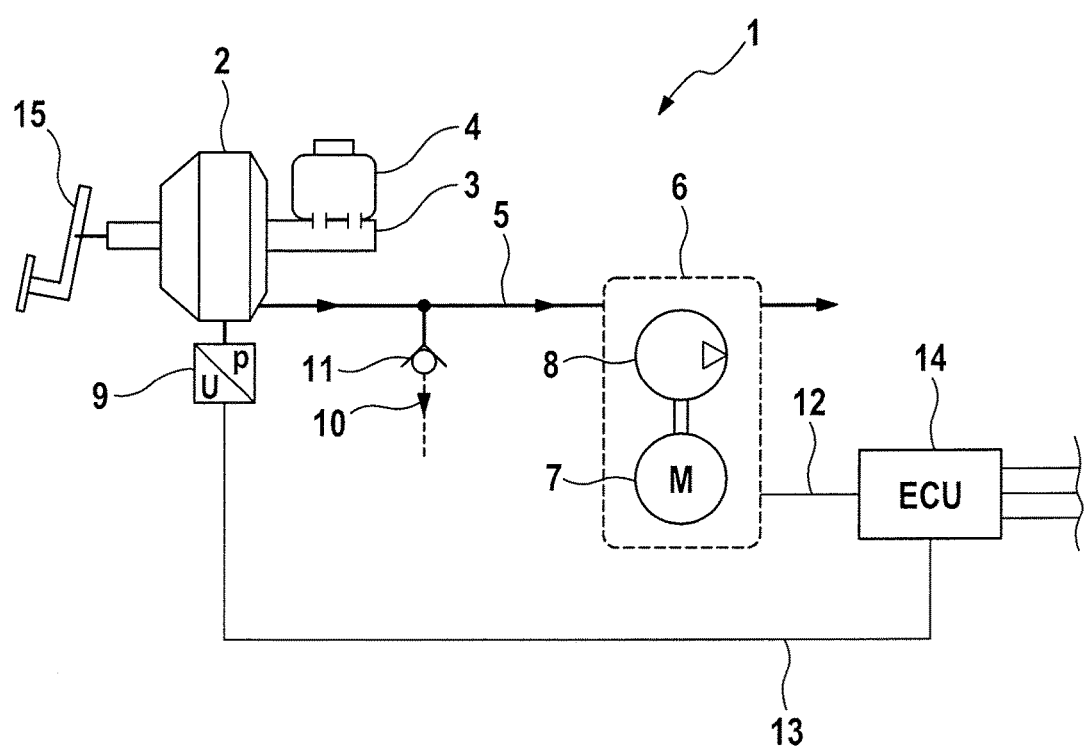
FIG. 1 shows part of a brake system which is suitable for applying the method according to the invention, in a highly simplified basic illustration.

That part of a brake system 1 preferably installed in a motor vehicle which is shown in FIG. 1 has a pneumatic brake booster 2 with at least one movable wall (not shown) which divides the interior of the brake booster 2 into at least one booster working chamber and at least one booster vacuum chamber, and the movement of which can be controlled by a pressure difference on both sides of the wall, and the position can be determined at any time by means of a suitable device, a master brake cylinder 3 which is connected to the brake booster 2, a pressure medium-equalizing vessel 4 which is attached to the master brake cylinder 3 and hydraulically connected thereto, a pump assembly 6 which is connected to the brake booster 2 via a vacuum line 5, wherein the pump assembly 6 has an electric drive 7 and a pump 8, and a pressure sensor 9 for delay-free monitoring of the vacuum level which is present. By means of a further vacuum line 10, a further vacuum supply source (not shown), such as an intake manifold of a naturally aspirated spark-ignition engine, can be connected to the brake booster 2. A non-return valve 11 ensures that the further supply source is disconnected from the pump assembly 6 here. The electrical lines 12 and 13 ensure an electrical connection of the pump assembly 6 or of the pressure sensor 9 to an electronic control unit 14, which is itself connected to further components (not shown) and is suitable for controlling the pump assembly 6 and for evaluating a signal of the pressure sensor 9. It is also possible to provide further electronic control units between the pressure sensor 9 and the control unit 14 or between the pump assembly 6 and the control unit 14, without departing from the invention.

The system shown is configured in such a way that, for the sake of a satisfactory brake function, the vacuum level or pressure value p in the booster vacuum chamber can never infringe a defined critical limiting value, and is continuously monitored for this purpose on an operationally ready brake system. In order to comply with the defined limiting value, the pump assembly 6 is switched on or off as necessary. In addition, the pressure value p can only assume a limited value range, for example overall between 0.2 and 1 bar depending on the operating state, owing to a technical design configuration of the components used.

It is also to be noted that the volume to which a vacuum is applied, and which contains essentially the booster vacuum chamber or chambers of the brake booster 2, vacuum line, working chambers of the pump assembly and assigned ducts, is structurally configured and, of course, is known in every operating state of the brake system and as a result constitutes an analogy of a closed reservoir with a pressure value p which is the same everywhere in the latter.

The brake booster 2 is activated by an activation element 15 which is embodied as a brake pedal which acts on the brake booster 2. Alternatively, or in combination with the brake pedal, further activation elements which can be triggered by the driver or independently of the driver are also possible and permissible within the invention, these being, for example, electromechanical, electromagnetic and electrohydraulic actuators, as well as further actuators and comparable assemblies.

The master brake cylinder 3 is connected via hydraulic lines (not shown) and, if appropriate, with the intermediate connection of further hydraulic or electrohydraulic assemblies, to wheel brakes (not shown either).

FIG. 2

Figure 2:
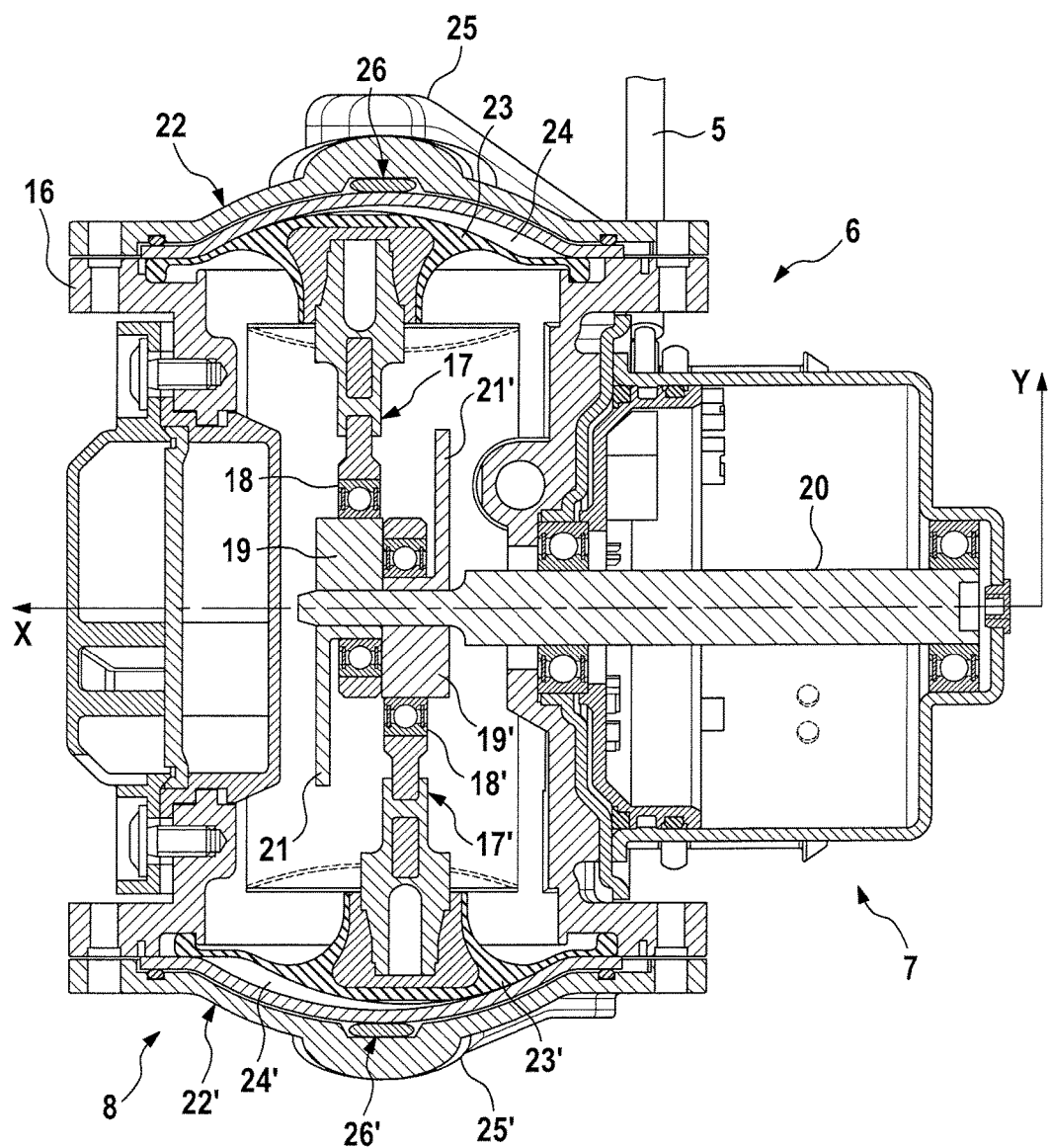
FIG. 2 shows an example of a pump assembly, which is suitable for applying the method according to the invention, in a sectional illustration.

FIG. 2 shows by way of example a longitudinal section through a dry-running pump assembly 6 which is suitable for applying the method according to the invention. The pump assembly 6 has an electric drive 7 and a pump 8 which is connected to the drive 7. The pump 8 has a pump housing 16 with two expeller elements 17, 17' which are arranged therein. The expeller elements 17, 17' are arranged in a rotatable fashion on eccentric elements 19, 19' by means of bearing elements 18, 18'. In addition, the pump 8 has two working space lids 22, 22' which are arranged on the pump housing 16, and the expeller elements 17, 17' have elastic diaphragm elements 23, 23' which are each clamped in at their circumference between a working space lid 22, 22' and the pump housing 16 in an airtight manner. As a result, working spaces 24, 24' are bounded between the working space lids 22, 22' and the diaphragm elements 23, 23'.

The figure shows that the expeller elements 17, 17' are positioned in a boxer arrangement in the pump 8. The eccentric elements 19, 19' are arranged in a captive fashion, offset through 180° radially and axially with respect to one another, on a drive shaft 20 of the drive 7, with the result that when the drive shaft 20 rotates about the rotational axis X the two expeller elements 17, 17' each carry out synchronous stroke movements in opposite directions approximately in the stroke direction Y. For smooth operation, the eccentric elements 19, 19' have balancing elements 21, 21' which serve to equalize unbalance caused by the respective expeller element 17, 17'.

As a result of the stroke movements of the expeller elements 17, 17' in opposite directions, the respective diaphragm elements 23, 23' are deformed alternately in the direction of the respective working space lids 22, 22' and back, with the result that the respective working spaces 24, 24' correspondingly become smaller and larger, wherein at a top dead center of the expeller element 17, 17' the working space 24, 24' has its minimum volume, and at a bottom dead center it has its maximum volume.

The working spaces 24, 24' are connected via a system of integrated ducts 25, 25' to the vacuum line 5 and therefore to the brake booster 2 (FIG. 1). The valve arrangements 26, 26' which are embodied with plate-type non-return valves ensure that, in the case of a stroke movement of the expeller element 17, 17' which makes the working space larger, the air is sucked into the respective working space 24, 24' via the vacuum line 5, and in the case of a stroke movement which makes the working space smaller the air is expelled from the working space 24, 24' into the surrounding atmosphere. Because air is a compressible fluid medium, in the case of a complete stroke of the expeller element 17, 17' local pressure value peaks can be measured in the working spaces 24, 24' and the vacuum line 5 and brake booster 2 connected thereto, wherein at the top dead center of the expeller element 17, 17' a local pressure value maximum is present, and at the bottom dead center a local pressure value minimum is present, ignoring a distance-dependent and volume-dependent difference in time. The amplitude between a local pressure value maximum which is assigned to the individual stroke of an individual expeller element and its next pressure value minimum can be referred to as a pressure value amplitude.

Figure 3:
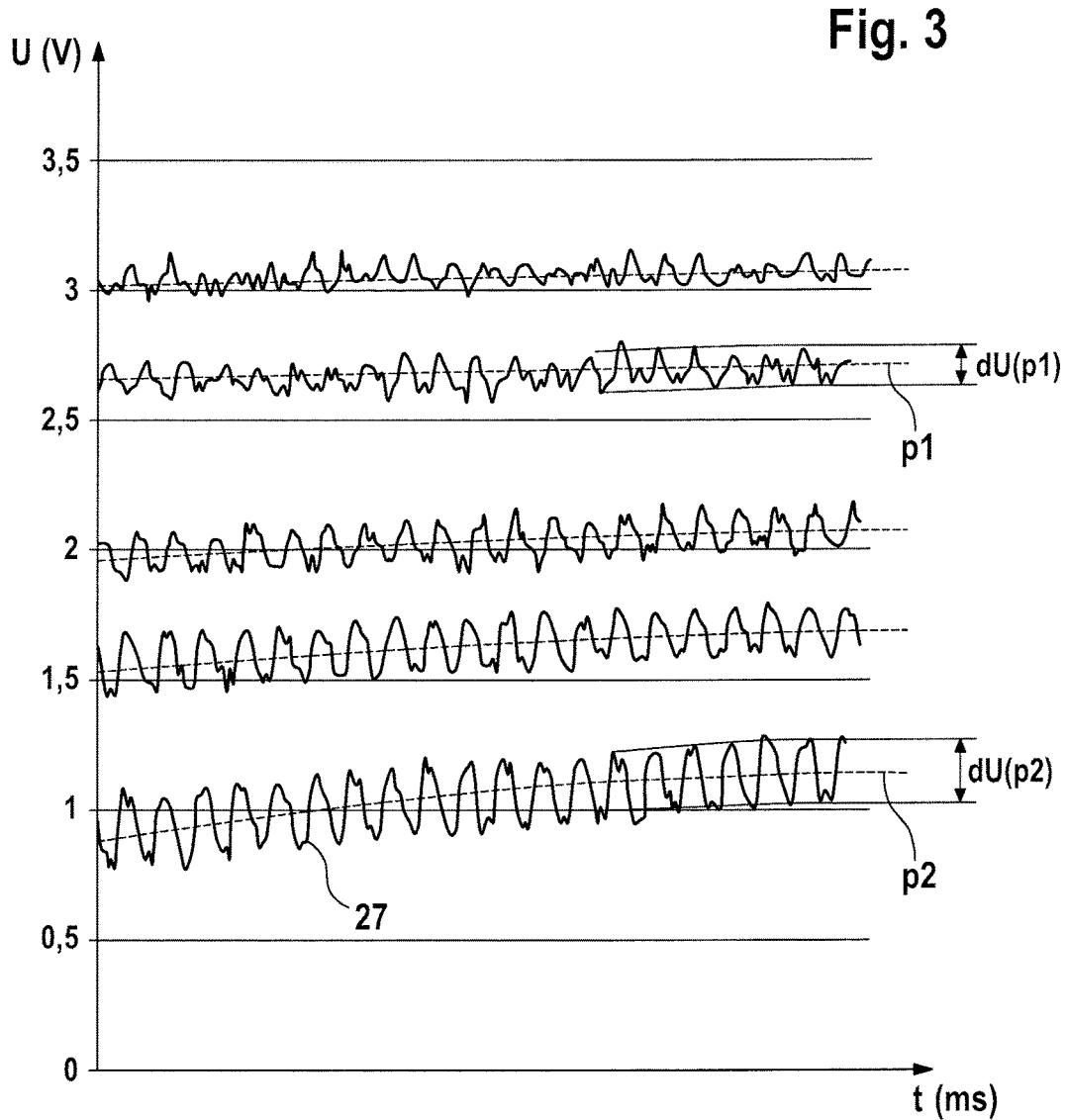
FIG. 3 shows a diagram of a sensor signal which is recorded in the method according to the invention.

An exemplary pressure profile, which can be detected in a brake booster which is suitable according to the invention, during operation of the pump assembly 6 is represented in FIG. 3.

FIG. 3

The diagram in FIG. 3 shows the behavior of the pressure value amplitude dU described above, as a function of the pressure values p during operation of the pump assembly 6.

In this context, the diagram is basically a representation of a signal which is recorded by the pressure sensor 9 during a time period and is present in the form of a pressure-dependent, electrical voltage U. The lower the pressure value p, the higher the voltage U. For the sake of clarity, the diagram which otherwise extends excessively far into the horizontal has been shortened to a page width and a number of signal sections which are associated with the different pressure ranges are illustrated one above the other instead of following one another. In this context, the bottom signal section shows the situation at the start of a vacuum build-up at approximately atmospheric pressure, and the top signal section shows the situation in the case of a virtually saturated, maximum achievable vacuum, and further signal sections show the intermediate states. On the perpendicular axis, the electrical voltage of the signal U is plotted here in volts, and on the horizontal axis the time t in milliseconds. The recorded signal curve 27 of the pressure sensor 9 shows a sinusoidal pattern, caused by the stroke movements of the expeller elements which cause the local pressure value maximums and pressure value minimums described already with respect to FIG. 2. An amplitude between the specified extreme values can be detected as pressure value amplitude dU and recorded. Utilization of the described substantive content permits a profile of the signal to be used to diagnose the pressure sensor 9 during a stroke of the expeller element 17, 17', since said signal alone contains all the necessary information in order to decide about the plausibility of the sensor behavior at a specific operating point.

From the behavior of the pressure value p with a given reservoir and in the case of stroke movements of the expeller elements, it is possible to read from the illustrated diagram that the pressure value amplitude dU changes by way of a direct dependence of the pressure value p which is present in the reservoir, i.e. with a relatively low pressure value p (equivalent to a relatively high vacuum) the pressure value amplitude dU decreases. The curves p1 and p2 form a filtered signal which is associated with the respective pressure value and which represents approximately a mean value of the respective pressure value amplitude dU. It is clearly apparent that the pressure value amplitude dU(p2) at a relatively high pressure value p2 is significantly larger than the pressure value amplitude dU(p1) at a relatively low pressure value p1.

When the pump assembly 6 starts, the pressure value amplitude dU(p) can be measured and be compared with a known limiting-value comparison value which has been calculated in advance or measured in a brake system which has been proven to be free of problems (limiting values for the respective maximum or minimum permissible pressure value amplitude dU(p) which is assigned to the pressure value p determined at the measuring time). These comparison values are known a priori to the system and are stored, for example, in the electronic control unit 14. If the measured pressure value amplitude dU is not within the two limits (minimum and maximum), a deviation is present which exceeds the permissible absolute value, and the signal of the pressure sensor is therefore to be assessed as not being plausible. It is possible to decide on this basis that the sensor values are not reliable values, and for example a defect is present. On this basis, further measures or reaction activities, for example the issuing of a warning message to the driver or activation of a separate engine control program or brake system control program, can be triggered, for example initiated by the electronic control unit. In this context, there is no need whatsoever for comparison signals of a further redundant sensor in order to detect the signal plausibility.

This method can be repeated for various pressure values p in so far as the permissible comparison values for the pressure value amplitude dU for respective pressure values p are known a priori and are present in a stored form. Therefore, continuous plausibility checking of the pressure values transmitted by the pressure sensor 9 is possible.

For example, the following plausibility checking of an individual pressure sensor 9 can be carried out in an electronic control unit 14:

a) The plausibility of an average, recorded pressure value p can be checked against a pressure value minimum and pressure value maximum with respective strokes of the expeller element. This means that for a specific brake system a dependence p=k(p) can be verified, wherein k(p) is a characteristic diagram.

b) For the purpose of more precise determination, the dependence described above can be widened to k(p, p_ext, T, U_m, I_m, a), where p_ext=the external pressure which is currently present, T=the current pump temperature or ambient temperature, U_m=the current engine voltage (or voltage in the electrical on-board power system of the motor vehicle), I_m=the current engine current (or current in the electrical on-board power system of the motor vehicle), and a=service life of the pump assembly (or operating hours).

c) The plausibility of an average, recorded pressure value p of the pressure sensor 9 or else pressure value minimum and pressure value maximum can be checked with respective strokes of the expeller element against the pressure value amplitude dU. This means that for a specific brake system a dependence p=k(p_vac) *A_pump can be verified, wherein k(p) constitutes a characteristic diagram which is to be determined and is stored in a control unit 14, and A_pump constitutes a measured pressure value amplitude during a stroke of the expeller element.

d) For more precise determination, the dependence, described above, of the characteristic diagram can be extended to k(p, p_ext, T, U_m, I_m, a), where p_ext=external pressure which is currently present, T=current pump temperature or ambient temperature, U_m=current engine voltage (or voltage in the electrical on-board power system of the motor vehicle), I_m=current engine current (or current in the electrical on-board power system of the motor vehicle), and a=service life of the pump assembly (or operating hours).

e) Since a non-predefined behavior of the signals can occur in highly dynamic situations, for example when the brake pedal is activated, in one inventive development of the method it is possible, in order to avoid incorrect interpretations, to deactivate the plausibility checking briefly for a configurable period by means of methods specified above, when the following events occur:

Activation of the brake booster 2 by activation elements 15 or a further assembly, Starting up of the pump assembly 6, Cold start of a main drive of the motor vehicle, for example of an internal combustion engine, Activation of a handbrake, Overvoltage or undervoltage or voltage pulses in an electrical on-board power system of the motor vehicle, Further events which influence a signal of the pressure sensor 9 briefly but significantly.

f) In a further embodiment, the characteristic diagrams described above can be determined or recorded automatically when the pump assembly first starts, and can be stored in the electronic control unit.

g) In a further embodiment, in order to determine a characteristic diagram automatically, a varying voltage can be applied, for example by means of PWM (pulse-width modulation). The variation in the voltage can be delayed until the vacuum signal is saturated, with the result that the variation of a rotational speed or voltage depends solely on the supplied voltage value.

FIG. 4

Figure 4:
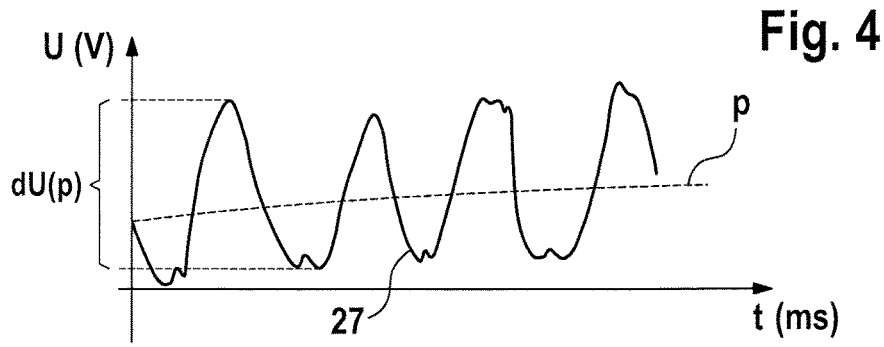
FIG. 4 shows a simplified illustration of a relationship between the native sensor signal and the pressure value p of the pressure value amplitude dU(p).

The diagram in FIG. 4 illustrates, in a simplified illustration, the differences between the actual native signal of the pressure sensor 9, illustrated by the signal curve 27, the averaged pressure value p which is acquired from the signal curve 27 by signal evaluation (for example filtering, rectifying, interpolation or another method), and a pressure value amplitude dU(p) which can be read from the signal curve.

LIST OF REFERENCE SIGNS

1 Brake system
2 Brake booster
3 Master brake cylinder
4 Pressure medium equalizing vessel
5 Vacuum line
6 Pump assembly
7 Drive
8 Pump
9 Pressure sensor
10 Vacuum line
11 Non-return valve
12 Electrical line
13 Electrical line
14 Electronic control unit
15 Activation element
16 Pump housing
17, 17' Expeller element
18, 18' Bearing element
19, 19' Eccentric element
20 Drive shaft
21, 21' Balancing element
22, 22' Working space lid
23, 23' Diaphragm element
24, 24' Working space
25, 25' Duct
26, 26' Valve arrangement
Signal curve
p,p1,p2 Pressure value
dU Pressure value amplitude
X Rotational axis
Y Stroke direction

The invention claimed is:

1. A method for supplying a vacuum for a pneumatic brake booster for a motor vehicle brake system by an electromotively-driven displacement type pump assembly, wherein at least one pressure sensor for monitoring a pneumatic pressure is assigned to the pump assembly and wherein electrical signals of the pressure sensor are fed to an electronic control unit and analyzed and processed in order to regulate the pressure, the method comprising:

emitting a signal by the pressure sensor and receiving the emitted signal by the electronic control unit, wherein the signal contains a profile of a pressure value within a stroke of an expeller element, determining a pressure value amplitude (dU) as a difference between a pressure value maximum and a pressure value minimum within a stroke of the expeller element, wherein the pressure value amplitude (dU) is determined from the signal by signal analysis, determining an averaged pressure value (p) from the signal by signal analysis, and plausibility checking of the signal of the pressure sensor in that the determined pressure value amplitude (dU) is compared with a stored comparison value, and a deviation of the pressure value amplitude (dU) from the comparison value is detected and the signal of the pressure sensor is defined as implausible if the deviation exceeds a defined absolute value, wherein the comparison value constitutes an expected pressure value amplitude for a defined averaged pressure value (p).

2. The method as claimed in claim 1, wherein a plurality of comparison values are stored in a characteristic diagram in the electronic control unit, wherein the characteristic diagram is assigned to the value range of the pressure value (p).

3. The method as claimed in claim 1 wherein the signal of the pressure sensor is not defined as implausible until the deviation of the pressure value amplitude (dU) from the comparison value exceeds a defined absolute value in a configurable number of cases.

4. The method as claimed in claim 1, wherein the electronic control unit initiates at least one reaction activity to warn the driver or to influence an engine controller or a brake controller or to set an error code if the signal of the pressure sensor is defined as implausible.

5. The method as claimed in claim 1, wherein the plausibility checking is carried out continuously during the operation of the pump assembly.

6. The method as claimed in claim 1, wherein the comparison values or the characteristic diagram are calculated or recorded before the pump assembly is first activated, and are subsequently stored in the electronic control unit.

7. The method as claimed in claim 1, wherein the comparison values or the characteristic diagram are recorded during a first activation of the pump assembly and are subsequently stored in the electronic control unit.

8. The method as claimed in claim 1, wherein the comparison values or the characteristic diagram are recorded during a first activation of the brake system and are stored in the electronic control unit.

9. The method as claimed in claim 1, wherein, the plausibility checking can be suspended for a configurable period.

10. The method as claimed in claim 9, wherein the plausibility checking is suspended for a configurable period at least
in the case of activation of the brake booster by activation elements or a further assembly or
in the case of starting up of the pump assembly or
in the case of a cold start of a main drive of the motor vehicle or
in the case of activation of a handbrake or
in the case of registration of an overvoltage or undervoltage or of a voltage pulse in an electrical on-board power system of the motor vehicle.

11. The method as claimed in claim 2, wherein the characteristic diagram comprises at least one further value range containing values:
of an external pressure which is present and/or
of a pump temperature and/or
of an ambient temperature and/or
of a voltage in an electrical on-board power system of the motor vehicle and/or
of a current in an electrical on-board power system of the motor vehicle and/or
of a number of the operating hours of the pump assembly.

12. A pump assembly for carrying out the method as claimed in claim 1, wherein the pump assembly has two expeller elements which can move synchronously in opposite directions, wherein the expeller elements are arranged in a boxer arrangement and have elastic diaphragm elements at their ends, and wherein a single pressure sensor is provided for monitoring a pressure difference between at least one working chamber and at least one vacuum chamber of the brake booster or a pressure prevailing in at least one vacuum chamber of the brake booster and for checking the plausibility of the signal of the pressure sensor.

13. The method as claimed in claim 2, wherein the signal of the pressure sensor is not defined as implausible until the deviation of the pressure value amplitude (dU) from the comparison value exceeds a defined absolute value in a configurable number of cases.

14. The method as claimed in claim 2, wherein the comparison values or the characteristic diagram are calculated or recorded before the pump assembly is first activated, and are subsequently stored in the electronic control unit.

15. The method as claimed in claim 2, wherein, the comparison values or the characteristic diagram are recorded during a first activation of the pump assembly and are subsequently stored in the electronic control unit.

16. The method as claimed in claim 2, wherein the comparison values or the characteristic diagram are recorded during a first activation of the brake system and are stored in the electronic control unit.

* * * * *